(12) United States Patent
Ohta

(10) Patent No.: US 11,251,461 B2
(45) Date of Patent: Feb. 15, 2022

(54) METHOD FOR PRODUCING ELECTRODE, ELECTRODE, AND ELECTRODE-ELECTROLYTE LAYER ASSEMBLY

(71) Applicant: Toyota Jidosha Kabushiki Kaisha, Toyota (JP)

(72) Inventor: Shingo Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/232,600

(22) Filed: Dec. 26, 2018

(65) Prior Publication Data

US 2019/0207248 A1 Jul. 4, 2019

(30) Foreign Application Priority Data

Dec. 28, 2017 (JP) .............................. JP2017-253783

(51) Int. Cl.
*H01M 10/0562* (2010.01)
*H01M 4/36* (2006.01)
(Continued)

(52) U.S. Cl.
CPC ..... *H01M 10/0562* (2013.01); *H01M 4/0471* (2013.01); *H01M 4/131* (2013.01);
(Continued)

(58) Field of Classification Search
CPC .. H01M 10/562; H01M 4/0471; H01M 4/131; H01M 4/133; H01M 4/134;
(Continued)

(56) References Cited

U.S. PATENT DOCUMENTS 8,986,895 B2  3/2015  Ohta et al.
9,531,036 B2  12/2016  Ohta et al.
(Continued)

FOREIGN PATENT DOCUMENTS

EP  3252024 A1  12/2017
EP  3410529 A1  12/2018
(Continued)

OTHER PUBLICATIONS

Office Action dated Oct. 18, 2019 in U.S. Appl. No. 16/126,137.
(Continued)

*Primary Examiner* — Sarah A. Slifka
*Assistant Examiner* — Rachel L Zhang
(74) *Attorney, Agent, or Firm* — Dinsmore & Shohl LLP

(57) ABSTRACT

A method for producing an electrode comprising a porous garnet-type ion-conducting oxide sintered body with high ion conductivity, the electrode, and an electrode-electrolyte layer assembly comprising the electrode and an electrolyte layer comprising a dense garnet-type ion-conducting oxide sintered body with high ion conductivity. Disclosed is a method for producing an electrode, the method comprising: preparing crystal particles of a garnet-type ion-conducting oxide; preparing a lithium-containing flux; preparing the electrode active material; preparing an electrolyte material by mixing the crystal particles of the garnet-type ion-conducting oxide and the flux; and sintering the electrolyte material and the electrode active material by heating at a temperature of 650° C. or less, wherein a number average particle diameter of the flux is larger than a number average particle diameter of the crystal particles of the garnet-type ion-conducting oxide.

9 Claims, 4 Drawing Sheets

(51) Int. Cl.
  *H01M 4/1391* (2010.01)
  *H01M 4/62* (2006.01)
  *H01M 4/134* (2010.01)
  *H01M 4/133* (2010.01)
  *H01M 4/04* (2006.01)
  *H01M 4/136* (2010.01)
  *H01M 4/1397* (2010.01)
  *H01M 4/1395* (2010.01)
  *H01M 4/1393* (2010.01)
  *H01M 4/131* (2010.01)

(52) U.S. Cl.
  CPC .......... *H01M 4/133* (2013.01); *H01M 4/134* (2013.01); *H01M 4/136* (2013.01); *H01M 4/1391* (2013.01); *H01M 4/1393* (2013.01); *H01M 4/1395* (2013.01); *H01M 4/1397* (2013.01); *H01M 4/366* (2013.01); *H01M 4/62* (2013.01); *H01M 2300/0071* (2013.01)

(58) Field of Classification Search
  CPC .. H01M 4/136; H01M 4/1391; H01M 4/1933; H01M 4/1395; H01M 4/1397; H01M 4/366; H01M 4/62
  See application file for complete search history.

(56) References Cited

U.S. PATENT DOCUMENTS

| | | | |
|---|---|---|---|
| 2010/0203383 A1 | 8/2010 | Weppner | |
| 2011/0244337 A1 | 10/2011 | Ohta et al. | |
| 2013/0323604 A1 | 12/2013 | Teshima et al. | |
| 2014/0162113 A1 | 6/2014 | Ohta et al. | |
| 2014/0227614 A1 | 8/2014 | Lee et al. | |
| 2015/0056519 A1* | 2/2015 | Ohta ................... | H01M 4/5825 429/320 |
| 2015/0111110 A1 | 4/2015 | Watanabe et al. | |
| 2017/0346092 A1 | 11/2017 | Yada et al. | |
| 2018/0175446 A1 | 6/2018 | Nishizaki et al. | |
| 2018/0219253 A1 | 8/2018 | Ohta | |
| 2018/0248201 A1 | 8/2018 | Shimoda et al. | |
| 2019/0074543 A1 | 3/2019 | Houjyou et al. | |
| 2019/0088993 A1 | 3/2019 | Ohta | |
| 2019/0207249 A1 | 7/2019 | Nakanishi et al. | |
| 2019/0207250 A1 | 7/2019 | Nakanishi et al. | |

FOREIGN PATENT DOCUMENTS

| | | |
|---|---|---|
| GN | 107017388 A | 8/2017 |
| GN | 107437633 A | 12/2017 |
| JP | 2012-096940 A | 5/2012 |
| JP | 2012-174659 A | 9/2012 |
| JP | 2013-037992 A | 2/2013 |
| JP | 2013-219017 A | 10/2013 |
| JP | 2013-232284 A | 11/2013 |
| JP | 2013-256435 A | 12/2013 |
| JP | 2014-241288 A | 12/2014 |
| JP | 2015-038030 A | 2/2015 |
| JP | 2015-041573 A | 3/2015 |
| JP | 2016-225089 A | 12/2016 |
| JP | 2017-033926 A | 2/2017 |
| JP | 2017-216222 A | 12/2017 |
| JP | 2018-206727 A | 12/2018 |
| WO | 2012114193 A1 | 8/2012 |
| WO | 2017018217 A1 | 2/2017 |
| WO | 2017130622 A1 | 8/2017 |

OTHER PUBLICATIONS

Yow, Zhen Feng et al., "Effect of Li+/H+ exchange in water treated Ta-doped Li7La3Zr2O12", Solid State Ionics 292, 2016, p. 122-129.
Awaka, Junji et al., "Single Crystal Synthesis of Cubic Garnet Related-Type Li7La3Zr2O12 by a Self-Flux Method", Key Engineering Materials, Jul. 4, 2011, p. 99-102, vol. 485.
Awaka, Junji et al., "Synthesis and structure analysis of tetragonal Li7La3Zr2O12 with the garnet-related type structure", Journal of Solid State Chemistry, 2009, p. 2046-2052, vol. 182, No. 8, Aug. 1, 2009.
Roof, Irina P. et al., "Crystal growth of a series of lithium garnets Ln3Li5Ta2O12 (Ln=La, Pr, Nd): Structural properties, Alexandrite effect and unusual ionic conductivity", Journal of Solid State Chemistry, Feb. 1, 2009, p. 295-300, vol. 182, No. 2.
Office Action dated Apr. 25, 2019 in U.S. Appl. No. 15/605,006.
Notice of Allowance dated Aug. 26, 2019 in U.S. Appl. No. 15/605,006.
Notice of Allowance dated Nov. 18, 2019 in U.S. Appl. No. 15/605,006.
Notice of Allowance dated Mar. 20, 2020 in U.S. Appl. No. 15/605,006.
Notice of Allowance dated Aug. 25, 2020 in U.S. Appl. No. 15/605,006.
Office Action dated Apr. 24, 2020 in U.S. Appl. No. 16/126,137.
Notice of Allowance dated Jun. 3, 2021 in U.S. Appl. No. 16/126,137.
Daniel Rettenwander et al., "Crystal chemistry of "Li7La3Zr2O12" garnet doped with Al, Ga, and Fe: a short review on ocal structures as revealed by NMR and Möbbauer spectroscopy studies", European Journal of Mineralogy, vol. 28, No. 3, 2016, p. 619-629.
Notice of Allowance dated Nov. 25, 2020, in U.S. Appl. No. 16/126,137.
G. Larraz et al., Cubic phases of garnet-type Li7La3Zr2O12: the role of hydration, Journal of Materials Chemistry A, vol. 1, No. 37, pp. 11419-11428.
U.S. Notice of Allowance dated Sep. 22, 2021, in U.S. Appl. No. 16/126,137.

* cited by examiner

METHOD FOR PRODUCING ELECTRODE, ELECTRODE, AND ELECTRODE-ELECTROLYTE LAYER ASSEMBLY

CROSS-REFERENCE TO RELATED APPLICATIONS

This application claims priority to Japanese Patent Application No. 2017-253783 filed Dec. 28, 2017, which is incorporated herein by reference in its entirety including the specification, drawings and abstract.

TECHNICAL FIELD

The disclosure relates to a method for producing an electrode, the electrode, and an electrode-electrolyte layer assembly comprising the electrode.

BACKGROUND

To suppress electrode cracking due to expansion and contraction of active materials, there is a demand for a porous electrode. Also, it is known to use a porous material as a method for suppressing lithium dendrite growth in a separator.

As a structure for preventing a separator from being penetrated by a lithium dendrite. Patent Literature 1 discloses a sheet-shaped solid electrolyte comprising an oxide sintered body and including a dense portion and a porous portion.

Patent Literature 1: Japanese Patent Application Laid-open No. 2013-232234

To obtain a porous solid electrolyte, Patent Literature 1 discloses that a slurry is prepared by mixing water and a powder of a garnet-type ion-conducting oxide, which is a raw material for an oxide electrolyte sintered body, and the slurry is freeze-dried and then sintered at 1100° C.

To form an excellent interface between an electrolyte layer and an electrode containing a garnet-type ion-conducting oxide as an oxide electrolyte, it is needed to integrally sinter the electrode and the electrolyte layer. However, since the sintering temperature of 1100° C. is too high, a reaction is caused between the electrode active material and the oxide electrolyte, and there is a problem in that an oxide electrolyte sintered body thus obtained has low ion conductivity.

On the other hand, when the sintering temperature is low, the particles of the oxide electrolyte cannot be sufficiently bonded, and there is a problem in that the thus-obtained oxide electrolyte sintered body has low ion conductivity.

Therefore, there is a problem in that it is difficult to obtain an oxide electrolyte sintered body that is excellent in both ion conductivity and porosity.

SUMMARY

In light of the above circumstance, an object of the disclosed embodiments is to provide a method for producing an electrode comprising a porous garnet-type ion-conducting oxide sintered body with high ion conductivity, the electrode, and an electrode-electrolyte layer assembly comprising the electrode and an electrolyte layer comprising a dense garnet-type ion-conducting oxide sintered body with high ion conductivity.

In a first embodiment, there is provided a method for producing an electrode comprising a first oxide electrolyte sintered body and an electrode active material, the method comprising:
preparing crystal particles of a garnet-type ion-conducting oxide represented by the following general formula (A):

$$(Li_{x-3y-z}E_yH_z)L_\alpha M_\beta O_\gamma \qquad \text{General Formula (A)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

preparing a lithium-containing flux;
preparing the electrode active material;
preparing an electrolyte material by mixing the crystal particles of the garnet-type ion-conducting oxide and the flux; and
sintering the electrolyte material and the electrode active material by heating at a temperature of 650° C. or less,
wherein a number average particle diameter of the flux is larger than a number average particle diameter of the crystal particles of the garnet-type ion-conducting oxide.

In another embodiment, there is provided an electrode comprising a first oxide electrolyte sintered body and an electrode active material, wherein the first oxide electrolyte sintered body has grain boundaries between crystal particles of a garnet-type ion-conducting oxide represented by the following general formula (B):

$$(Li_{x-3y-z}E_yH_z)L_\alpha M_\beta O_\gamma \qquad \text{General Formula (B)}$$

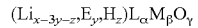

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a lithium-containing flux is present at grain boundary triple junctions between the crystal particles; and
wherein the first oxide electrolyte sintered body is a porous body having a voidage of 27% or more.

In another embodiment, there is provided an electrode comprising a first oxide electrolyte sintered body and an electrode active material, wherein the first oxide electrolyte sintered body has grain boundaries between crystal particles of a garnet-type ion-conducting oxide represented by the following general formula (B):

$$(Li_{x-3y-z}E_yH_z)L_\alpha M_\beta O_\gamma \qquad \text{General Formula (B)}$$

where E is at least one kind of element selected from the group consisting of Al, Ga, Fe and Si; L is at least one kind of element selected from the group consisting of an alkaline-earth metal and a lanthanoid element; M is at least, one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a number average particle diameter of the crystal particles is 3 μm or less; and wherein the first oxide electrolyte sintered body is a porous body having a voidage of 27% or more.

For the electrode, y in the general formula (B) may be in a range of 0.13<y<0.22.

In another embodiment, there is provided an electrode-electrolyte layer assembly comprising the electrode of the disclosed embodiments and an electrolyte layer comprising a second oxide electrolyte sintered body, wherein the second oxide electrolyte sintered body has grain boundaries between crystal particles of a garnet-type ion-conducting oxide represented by the following general formula (C):

     General Formula (C)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively, and wherein a lithium-containing flux is present at grain boundary triple junctions between the crystal particles.

For the electrode-electrolyte layer assembly, y in the general formula (C) may be in a range of $0 \leq y \leq 0.13$.

According to the disclosed embodiments, a method for producing an electrode comprising a porous garnet-type ion-conducting oxide sintered body with high ion conductivity, the electrode, and an electrode-electrolyte layer assembly comprising the electrode and an electrolyte layer comprising a dense garnet-type ion-conducting oxide sintered body with high ion conductivity, can be provided.

BRIEF DESCRIPTION OF THE DRAWINGS

In the accompanying drawings.

DETAILED DESCRIPTION

1. Method for Producing Electrode

Figure 1:
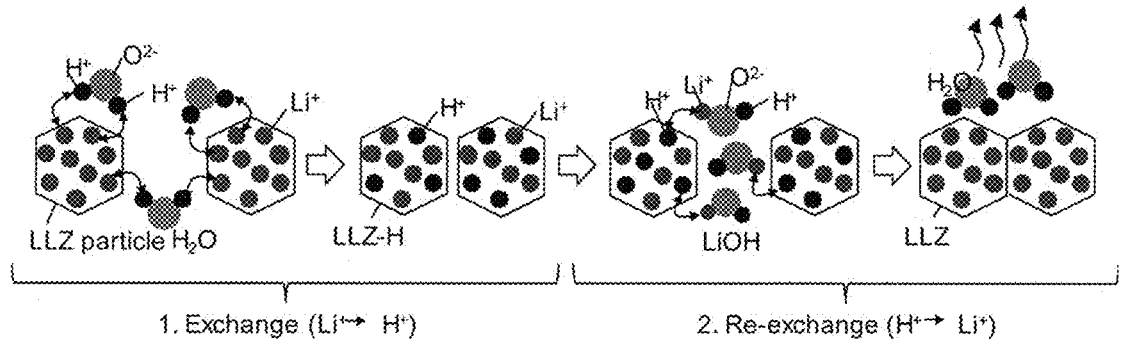
FIG. 1 is a schematic view showing the outline of a solid phase flux reaction method used in the disclosed embodiments.

The method for producing an electrode according to the disclosed embodiments, is a method for producing an electrode comprising a first oxide electrolyte sintered body and an electrode active material, the method comprising:

preparing crystal particles of a garnet-type ion-conducting oxide represented by the following general formula (A):

     General Formula (A)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

preparing a lithium-containing flux;

preparing the electrode active material;

preparing an electrolyte material by mixing the crystal particles of the garnet-type ion-conducting oxide and the flux; and sintering the electrolyte material and the electrode active material by heating at a temperature of 650° C. or less, wherein a number average particle diameter of the flux is larger than a number average particle diameter of the crystal particles of the garnet-type ion-conducting oxide.

In the disclosed embodiments, the oxide electrolyte is a concept that encompasses the garnet-type ion-conducting oxide.

In the disclosed embodiments, the oxide electrolyte sintered body is a concept that encompasses the sintered body of the garnet-type ion-conducting oxide (or the garnet-type ion-conducting oxide sintered body).

In the disclosed embodiments, for the sake of simplicity, the oxide electrolyte sintered body contained in the electrode is referred to as "first oxide electrolyte sintered body".

In the disclosed embodiments, for the sake of simplicity, the oxide electrolyte sintered body contained in the electrolyte layer is referred to as "second oxide electrolyte sintered body".

In the disclosed embodiments, the garnet-type ion-conducting oxide not subjected to substitution of lithium ions with hydrogen ions, may be referred to as "garnet-type ion-conducting oxide not subjected to substitution with hydrogen ions".

In the disclosed embodiments, the garnet-type ion-conducting oxide subjected to substitution of part of lithium ions with hydrogen ions and not subjected to sintering, may be referred to as "garnet-type ion-conducting oxide subjected to substitution with hydrogen ions".

In the disclosed embodiments, the garnet-type ion-conducting oxide subjected to sintering may be referred to as "garnet-type ion-conducting oxide sintered body" or "sintered garnet-type ion-conducting oxide".

In the disclosed embodiments, the general formula (A) indicates the garnet-type ion-conducting oxide subjected to substitution with hydrogen ions.

In the disclosed embodiments, the below-described general formulae (B) and (C) indicate at least the sintered garnet-type ion-conducting oxide.

The garnet-type ion-conducting oxide used as the oxide electrolyte, is needed to be sintered by heating at a temperature of 900° C. or more, in order to bond the crystal particles of the garnet-type ion-conducting oxide, form an excellent interface and increase ion conductivity. However, when the garnet-type ion-conducting oxide is heated at 900° C. or more, generally, liquid-phase sintering of the garnet-type ion-conducting oxide is initiated, and abnormal growth of the crystal particles is likely to occur. As a result, it is difficult to make the garnet-type ion-conducting oxide into a porous body.

Also, when heated at high temperature, the garnet-type ion-conducting oxide chemically reacts with an electrode active material such as Si, and there is a problem in that the electrode active material is altered (e.g., oxidation of Si).

In the disclosed embodiments, the crystal particles of the garnet-type ion-conducting oxide are bonded by a solid phase flux reaction method, using a chemical reaction between the flux material and the crystal particles of the garnet-type ion-conducting oxide subjected to substitution with hydrogen ions (a solid phase) as a driving force.

FIG. 1 is a schematic view showing the outline of the solid phase flux reaction method used in the disclosed embodiments.

The left part ("1. Exchange ($Li^+ \rightarrow H^+$)") of FIG. 1 shows the states of the crystal particles of the garnet-type ion-conducting oxide before and after part of the lithium ions ($Li^+$) of the crystal particles are substituted with hydrogen ions ($H^+$). In FIG. 1, the garnet-type ion-conducting oxide not containing hydrogen is referred to as LLZ, and the garnet-type ion-conducting oxide containing hydrogen is referred to as LLZ-H.

The right part ("2. Re-exchange ($H^+ \rightarrow Li^+$)") of FIG. 1 shows the states of the crystal particles of the garnet-type ion-conducting oxide before and after the hydrogen ions ($H^+$) in the crystal particles of the garnet-type ion-conducting oxide are substituted with the lithium ions ($Li^+$) of the flux. When the mixture is heated to the melting point of the flux, bonding between the lithium ions ($Li^+$) and anions ($OH^-$ in FIG. 1) in the flux is weakened. At this time, the hydrogen ions ($H^+$) in the crystal particles of the garnet-type ion-conducting oxide are substituted with the lithium ions ($Li^+$) in the flux.

As shown by the right part ("2. Re-exchange ($H^+ \rightarrow Li^+$)") of FIG. 1, the lithium ions ($Li^+$) of the flux are incorporated into the crystal of the crystal particles of the garnet-type ion-conducting oxide. The hydrogen ions ($H^+$) released from the inside of the crystal of the crystal particles of the garnet-type ion-conducting oxide, bind to the anions ($OH^-$ in FIG. 1) of the flux, form a reaction product and move outside the system; therefore, they do not remain between the crystal particles of the sintered garnet-type ion-conducting oxide.

According to the disclosed embodiments, by the solid phase flux reaction method, a reaction is caused at low temperature between the flux and the garnet-type ion-conducting oxide subjected to substitution with hydrogen ions, thereby evaporating the flux. Therefore, the flux can exert the same effects as a hole forming material.

Also, since the number average particle diameter of the flux is larger than the number average particle diameter of the crystal particles of the garnet-type ion-conducting oxide, relatively large voids can be successfully formed, and the sintered garnet-type ion-conducting oxide can be made into a porous body by low-temperature heating. As a result, a chemical reaction between the garnet-type ion-conducting oxide and the electrode active material can be suppressed, and a porous electrode can be obtained while suppressing the alteration of the electrode active material.

In addition, by changing the form or amount of the flux, the voidage of the porous body (the sintered garnet-type ion-conducting oxide thus obtained) can be controlled.

According to the disclosed embodiments, the electrode active material and the oxide electrolyte can be integrally sintered by selecting such a heating temperature that alternation, which is caused by a chemical reaction between the oxide electrolyte and the electrode active material, can be prevented in the production of the electrode comprising, as the oxide electrolyte, the garnet-type ion-conducting oxide subjected to substitution with hydrogen ions.

Also, battery production costs can be reduced by lowering the sintering temperature.

According to the disclosed embodiments, battery performance can be increased by using the garnet-type ion-conducting oxide in an electrode or in an electrolyte, which is determined depending on the amount of the element E in the garnet-type ion-conducting oxide.

In the case of using the garnet-type ion-conducting oxide in the electrode, as the garnet-type ion-conducting oxide, a garnet-type ion-conducting oxide with a desired voidage and high hardness can be used from the point of view that the electrode can adapt Lo expansion and contraction of the electrode active material, which is associated with occlusion and release of Li ions. In particular, y in the below-described general formulae (A), (B) and (D) may be a real number satisfying $0.13 < y < 0.22$.

In the case of using the garnet-type ion-conducting oxide in the electrolyte layer, as the garnet-type ion-conducting oxide, a garnet-type ion-conducting oxide with high density can be used from the viewpoint of obtaining high ion conductivity and functions as a separator. In particular, y in the below-described general formulae (A), (C) and (D) may be a real number satisfying $0 \leq y \leq 0.13$.

The hydrogen H in the general formula (A) may be contained in a range of $0 < z \leq 3.4$. When z is in a range of $0 < z \leq 3.4$, it means that hydrogen is certainly contained.

The electrode obtained by the production method of the disclosed embodiments comprises a first oxide electrolyte sintered body and an electrode active material.

The first oxide electrolyte sintered body may contain the crystal particles of the garnet-type ion-conducting oxide represented by the below-described general formula (B). Also, it may contain other conventionally-known electrolyte materials. The first oxide electrolyte sintered body will not be described here, since it will be described below.

The electrode production method of the disclosed embodiments comprises at least the following: (1) preparing garnet-type ion-conducting oxide crystal particles, (2) preparing a flux, (3) preparing an electrode active material, (4) preparing an electrolyte material, and (5) sintering. The order of the (1) to (3) is not particularly limited, and the (1) to (3) may be carried out in any order or at the same time.

(1) Preparing Garnet-Type Ion-Conducting Oxide Crystal Particles

This is to prepare crystal particles of a garnet-type ion-conducting oxide represented by the following general formula (A):

$$(Li_{x-3y-z}E_yH_z)L_\alpha M_\beta O_\gamma \qquad \text{General Formula (A)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively.

The crystal particles of the garnet-type ion-conducting oxide thus prepared, are particles represented by the general formula (A) and particles subjected to substitution of part of lithium ions with hydrogen ions ($0 < z \leq 3.4$ in the general formula (A)).

When the composition of the Li in the general formula (A) is $x-3y-z > 7$, it is presumed that the crystal structure of the garnet-type ion-conducting oxide is changed from a cubic crystal structure to a tetragonal crystal structure, thereby impairing crystal symmetry and decreasing the lithium ion conductivity of the garnet-type ion-conducting oxide sintered body obtained after sintering.

Meanwhile, when the composition of the Li in the general formula (A) is $x-3y-z < 3$, it is presumed that the potential of the 96h site (a specific site in which the Li in the crystal structure of the garnet-type ion-conducting oxide will be incorporated) increases and makes it difficult for the Li to be incorporated in the crystal, thereby decreasing Li occupancy and decreasing the lithium ion conductivity of the garnet-type ion-conducting oxide sintered body obtained after sintering.

As the element E, an element that is four-coordinated as with Li and has an ionic radius close to Li (Li: 0.59 Å) is used.

The garnet-type ion-conducting oxide used in the disclosed embodiments may contain, as the element E, at least one kind of element selected from the group consisting of Al, Ga, Fe and Si, at least one kind of element selected from the group consisting of Al and Ga, or an Al element.

In the disclosed embodiments, since the element E in the general formula (A) is contained in a range of $0 \leq y < 0.22$, the stability of the crystal structure of the garnet-type ion-conducting oxide can be increased, and the synthesis of the garnet-type ion-conducting oxide can be easy. In the electrode production, from the viewpoint of increasing the hardness of the garnet-type ion-conducting oxide to turn the oxide into an indestructible porous body, y in the above-mentioned general formula (A) and the below-mentioned general formulae (B) and (D) may be a real number satisfying $0.13 < y < 0.22$.

The element L contained in the garnet-type ion-conducting oxide used in the disclosed embodiments, is not particularly limited, as long as it is at least one kind of element selected from the group consisting of an alkaline-earth metal and a lanthanoid element. This is because a small change in the crystal structure and high ion conductivity can be obtained. As used herein, the alkaline-earth metal is a concept that encompasses Ca, Sr, Ba and Ra. The element L may be La, since the ion conductivity can be further increased.

In the disclosed embodiments, as long as the element L of the general formula (A) is contained in a range of $2.5 \leq \alpha \leq 3.5$, the crystal structure of the garnet-type ion-conducting oxide is stabilized, and the lithium ion conductivity of the garnet-type ion-conducting oxide sintered body obtained after sintering, is high. Therefore, $\alpha$ may be 3.

The element M contained in the garnet-type ion-conducting oxide used in the disclosed embodiments, is not particularly limited, as long as it is at least one kind of element selected from a transition element that can be six-coordinated with oxygen and typical elements in groups 12 to 15 of the periodic table. This is because the crystal structure is stabilized, and the lithium ion conductivity of the garnet-type ion-conducting oxide sintered body obtained after sintering, is high.

In the disclosed embodiments, as long as the element M of the general formula (A) is contained in a range of $1.5 \leq \beta \leq 2.5$, the crystal structure of the garnet-type ion-conducting oxide is stabilized, and the lithium ion conductivity of the garnet-type ion-conducting oxide sintered body obtained after sintering, is high. Therefore, $\beta$ may be 2.

As the element M, examples include, but are not limited to, Sc, Y, Ti, Zr, Hf, V, Nb, Ta, Cr, Mo, W, Mn, Fe, Co, Ni, Cu, Zn, Cd, Al, Ga, Ge, Sn, Sb and Bi.

The element M may be at least one kind of element selected from the group consisting of Zr, Nb and Ta, or it may be a combination of Zr with Nb or Ta, from the point of view that the crystal structure is stabilized, and the lithium ion conductivity of the garnet-type ion-conducting oxide sintered body obtained after sintering, is high.

When the element M is the combination of Zr with Nb or Ta, the amount of the Zr in the composition may be in a range of from 1.4 to 1.75, from the point of view that the crystal structure is stabilized, and the lithium ion conductivity of the garnet-type ion-conducting oxide sintered body obtained after sintering, is high.

On the other hand, when the element M is the combination of Zr with Nb or Ta, the amount of the Nb or Ta in the composition may be in a range of from 0.25 to 0.6, from the point of view that the crystal structure is stabilized, and the lithium ion conductivity of the garnet-type ion-conducting oxide sintered body obtained after sintering, is high.

In the disclosed embodiments, as long as the oxygen O contained in the composition of the garnet-type ion-conducting oxide is in a range of $11 \leq \gamma \leq 13$ in the general formula (A), the crystal structure of the garnet-type ion-conducting oxide is stabilized. Therefore, $\gamma$ may be 12.

In this preparing, commercially-available crystal particles or synthesized crystal particles may be used as the garnet-type ion-conducting oxide subjected to substitution with hydrogen ions.

In the case of using the synthesized crystal particles, the preparing of the crystal particles of the garnet-type ion-conducting oxide may include obtaining crystal particles of a garnet-type ion-conducting oxide represented by the following general formula (D) and not subjected to substitution with hydrogen ions, by mixing raw materials to be at a stoichiometric ratio that provides the garnet-type ion-conducting oxide represented by the following general formula (D) and not subjected to substitution with hydrogen ions, and heating the thus-obtained mixture. Moreover, it may include obtaining the garnet-type ion-conducting oxide represented by the general formula (A) and subjected to substitution with hydrogen ions, by substituting Li in the thus-obtained garnet-type ion-conducting oxide crystal particles represented by the general formula (D) and not subjected to substitution with hydrogen ions, with protons.

$$(Li_{x-3y-z}E_yH_z)L_\alpha M_\beta O_\gamma \qquad \text{General Formula (D)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x and y are real numbers satisfying $3 \leq x-3y \leq 7$ and $0 \leq y < 0.22$; and $\alpha$, $\beta$ and $\gamma$ real numbers in ranges of $2.5 \leq \alpha \leq 3.5$, $1.5 \leq \beta \leq 2.5$ and $11 \leq \gamma \leq 13$, respectively.

Compared to the garnet-type ion-conducting oxide represented by the general formula (A) (($Li_{x-3y-z}$, $E_y$, $H_z$)$L_\alpha M_\beta O_\gamma$), the garnet-type ion-conducting oxide represented by the general formula (D) (($Li_{x-3y}$, $E_y$)$L_\alpha M_\beta O_\gamma$) corresponds to a compound in which part of Li ions in the general formula (A) are not substituted with hydrogen ions. The garnet-type ion-conducting oxide represented by the general formula (D) will not be described here, since it is the same as the garnet-type ion-conducting oxide represented by the general formula (A), except that it is a garnet-type ion-conducting oxide not subjected to substitution with hydrogen ions.

In the case of synthesizing the garnet-type ion-conducting oxide not subjected to substitution with hydrogen ions, for example, it can be obtained by mixing raw materials to be at a stoichiometric ratio that provides the desired garnet-type ion-conducting oxide, and heating the mixture.

As the raw materials for the garnet-type ion-conducting oxide crystal particles, conventionally-known raw materials can be used. As the raw materials, examples include, but are not limited to, $LiOH(H_2O)$, $La(OH)_3$, $Al_2O_3$, $ZrO_2$ and $Nb_2O_5$.

The method for mixing the raw materials is not particularly Limited. As the mixing method, examples include, but are not limited to, a mortar, a planetary ball mill, a ball mill and a jet mill.

The heating temperature is not particularly limited, and it may be from room temperature to 1200° C.

The heating atmosphere is not particularly limited.

The heating time is not particularly limited, and it may be from 1 hour to 100 hours.

As the garnet-type ion-conducting oxide represented by the general formula (D) and not subjected to substitution with hydrogen ions, examples include, but are not limited to, $Li_7La_3Zr_2O_{12}$, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(Li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.2})La_3(Zr_{1.4}Nb_{0.6})O_{12}$, $(Li_{6.3}Al_{0.02})La_3(Zr_{1.4}Nb_{0.6})O_{12}$, $(Li_{6.2}Ga_{0.2})La_3Zr_{1.7}Nb_{0.3}O_{12}$.

In the production method of the disclosed embodiments, the method for substituting the Li ions in the garnet-type ion-conducting oxide represented by the general formula (D) and not subjected to substitution with hydrogen ions, with protons, is not particularly limited, as long as the garnet-type ion-conducting oxide represented by the general formula (A) and subjected to substitution with hydrogen ions, can be obtained. From the viewpoint of easily controlling the substitution amount, for example, a powder of the garnet-type ion-conducting oxide represented by the general formula (D) and not subjected to substitution with hydrogen ions, may be stirred and/or immersed in pure water for several minutes to 5 days at room temperature.

The amount of hydrogen ions incorporated by the substitution can be estimated from the amounts of Li ions in the garnet-type ion-conducting oxide before and after being subjected to the substitution, which are amounts obtained by carrying out inductively-coupled plasma (ICP) analysis on the powder of the garnet-type ion-conducting oxide before and after the substitution.

That is, the hydrogen ion amount in the garnet-type ion-conducting oxide subjected to substitution with hydrogen ions, cannot be quantitated by the inductively-coupled plasma (ICP) analysis; however, the lithium ion amounts in the garnet-type ion-conducting oxide before and after substitution with hydrogen ions, can be quantitated.

Therefore, the amount of lithium ion change before and after the substitution can be calculated from the lithium ion amounts in the garnet-type ion-conducting oxide before and after the substitution. From the amount of the lithium ion change, it is possible to estimate how much lithium ions were substituted with hydrogen ions.

(Quantitative Analysis of Protons)

The method for quantitating the protons in the garnet-type ion-conducting oxide, is not particularly limited. For example, it can be quantitated by using a combination of mass spectrometry (MS) and thermogravimetry (Tg), for example.

In general, the garnet-type ion-conducting oxide used in the disclosed embodiments is present as crystal at normal temperature. The crystal may be in a particulate form.

The number average particle diameter of the crystal particles of the garnet-type ion-conducting oxide is not particularly limited, as long as it is smaller than the number average particle diameter of the below-described flux. It may be smaller than the number average particle diameter of the flux, and it may be from 0.1 μm to 3 μm.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

(2) Preparing Flux (Lithium Compound)

This is to prepare a lithium-containing flux.

The lithium-containing flux (a lithium compound) is not particularly limited, and it may be a flux that has a melting point at around a temperature at which hydrogen ions are desorbed from the crystal particles of the garnet-type ion-conducting oxide subjected to substitution with hydrogen ions. As the flux, examples include, but are not limited to, LiOH (melting point: 462° C.), (melting point: 260° C.) and $Li_2SO_4$ (melting point: 859° C.). From the viewpoint of lowering the sintering temperature, the flux may be a flux with a low melting point, and it may be LiOH or $LiNO_3$. As the flux, one or more kinds of fluxes may be used.

The form of the flux may be a particulate form. When the form of the flux is a particulate form, the number average particle diameter of the flux is not particularly limited, as long as it is larger than the number average particle diameter of the crystal particles of the garnet-type ion-conducting oxide. From the viewpoint of efficiently making the electrode into a porous electrode, the number average particle diameter of the flux may be larger than the number average particle diameter of the crystal particles of the garnet-type ion-conducting oxide, and it may be more than 3 μm and 100 μm or less, 50 μm or less, or 20 μm or less. By controlling the number average particle diameter of the flux, the size of the voids of the oxide electrolyte sintered body can be controlled.

(3) Preparing Electrode Active Material

This is to prepare the electrode active material.

The electrode active material may be an electrode active material that is used as at least one of a cathode active material and an anode active material.

As the cathode active material, a conventionally-known material may be used. In the case of a lithium battery, as the cathode active material, examples include, but are not limited to, lithium cobaltate ($LiCoO_2$), lithium nickelate ($LiNiO_2$), $Li_{1+x}Ni_{1/3}Mn_{1/3}Co_{1/3}O_2$ lithium manganate ($LiMn_2O_4$), a different element-substituted Li—Mn spinel represented by the composition formula $Li_{1+x}Mn_{2-x-y}M_yO_4$ (where M is at least one kind of element selected from the group consisting of Al, Mg, Co, Fe, Ni and Zn; $0 \leq x < 0.5$; and $0 \leq y < 2$), lithium titanate, and lithium metal phosphate ($LiMPO_4$ where M is Fe, Mn, Co or Ni).

As the anode active material, examples include, but are not limited to, carbonaceous materials such as graphite and hard carbon, Si, Si alloy, and $Li_4Ti_5O_{12}$.

The form of the electrode active material is not particularly limited. As the form, examples include, but are not limited to, a particulate form and a plate form.

When the electrode active material is in a particulate form, the number average particle diameter of the electrode active material is not particularly limited. It may be 0.1 μm or more and may be 10 μm or less. From the viewpoint of allowing the electrode active material to easily enter the voids of the oxide electrolyte sintered body, it may be less than 3 μm.

(4) Preparing Electrolyte Material

This is to prepare an electrolyte material by mixing the crystal particles of the garnet-type ion-conducting oxide and the flux.

The method for mixing the crystal particles of the garnet-type ion-conducting oxide subjected to substitution with hydrogen ions and the flux, is not particularly limited. As the mixing method, examples include, but are not limited to, mixing them in a mortar, wet-mixing them in a solvent in which powder cannot be dissolved, and dissolving the flux in a solvent and evaporating the solvent to deposit the flux.

In the electrolyte material, the content of the crystal particles of the garnet-type ion-conducting oxide subjected to substitution with hydrogen ions, may be in a range of from 1 vol % to 99 vol %, when the total volume of the electrolyte material is determined as 100 vol %.

In the electrolyte material, the content of the flux may be in a range of from 1 vol % to 99 vol %, when the total volume of the electrolyte material is determined as 100 vol %.

The mixing ratio of the garnet-type ion-conducting oxide subjected to substitution with hydrogen ions and the flux, is not particularly limited. It may be in a range of from 50:50 (vol %) to 95:5 (vol %), or the molar amount of the lithium in the composition of the flux may be equal to the molar amount of the hydrogen in the composition of the garnet-type ion-conducting oxide subjected to substitution with hydrogen ions.

(5) Sintering

This is to sinter the electrolyte material and the electrode active material by heating at a temperature of 650° C. or less.

At the time of sintering, the electrolyte material and the electrode active material may be in a mixture form, from the viewpoint of allowing the electrode active material to efficiently enter the voids of the oxide electrolyte sintered body subjected to sintering.

The method for mixing the electrolyte material and the electrode active material is not particularly limited. As the method, examples include, but are not limited to, mixing them in a mortar.

The mixing ratio of the electrolyte material and the electrode active material in the mixture form is not particularly limited. It may be in a range of from 1:99 (vol %) to 99:2 (vol %).

In the sintering, the upper limit of the heating temperature may be 650° C. or less, or it may be 550° C. or less. The lower limit may be equal to or more than the melting point of the flux. The heating temperature may be 350° C. or more, or it may be 400° C. or more, from the viewpoint of promoting the resubstitution of, with the lithium ions in the lithium-containing flux, the protons in the garnet-type ion-conducting oxide crystal particles subjected to substitution with hydrogen ions.

In the sintering, a pressure is applied at the time of heating. The pressure is not particularly limited. The heating may be carried out under an atmospheric pressure condition or higher. At the time of heating, the upper limit of the pressure is not particularly limited. For example, it may be 6 ton/cm² (≈588 MPa) or less. From the viewpoint of increasing the voidage of the electrode comprising the thus-obtained garnet-type ion-conducting oxide sintered body, it is not needed to apply pressure.

In the sintering, the heating atmosphere is not particularly limited. From the viewpoint of suppressing the alteration of the electrode active material, the heating atmosphere may be an inert atmosphere.

In the production method according to the disclosed embodiments, the crystal particles of the garnet-type ion-conducting oxide subjected to substitution with hydrogen ions, are mixed with the lithium-containing flux. By heating the thus-obtained mixture, the protons in the crystal particles of the garnet-type ion-conducting oxide subjected to substitution with hydrogen ions, can be resubstituted with the lithium ions in the flux. By use of the chemical reaction caused in this resubstitution, the crystal particles of the garnet-type ion-conducting oxide can be bonded at lower temperature than ever before (e.g., at 350° C.).

Since the number average particle diameter of the flux is larger than the number average particle diameter of the crystal particles of the garnet-type ion-conducting oxide subjected to substitution with hydrogen ions, desired voids can be formed in the garnet-type ion-conducting oxide sintered body by the resubstitution.

The electrode obtained by the production method of the disclosed embodiments can be used as an electrode (cathode or anode) of various kinds of batteries. It can be used as an electrode of an all-solid-state battery.

2. Electrode

The electrode of the disclosed embodiments is an electrode comprising a first oxide electrolyte sintered body and an electrode active material, wherein the first, oxide electrolyte sintered body has grain boundaries between crystal particles of a garnet-type ion-conducting oxide represented by the following general formula (B):

$$(Li_{x-3y-z}E_yH_z)L_\alpha M_\beta O_\gamma \qquad \text{General Formula (B)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a lithium-containing flux is present at grain boundary triple junctions between the crystal particles; and wherein the first oxide electrolyte sintered body is a porous body having a voidage of 21% or more.

For the electrode of the disclosed embodiments, the number average particle diameter of the crystal particles of the garnet-type ion-conducting oxide may be 3 μm or less, and the first oxide electrolyte sintered body may be a porous body having a voidage of 21% or more.

The electrode of the disclosed embodiments comprises a first oxide electrolyte sintered body and an electrode active material.

The amount of the first oxide electrolyte sintered body contained in the electrode, is not particularly limited. It may be in a range of from 1 vol % to 99 vol %, when the total volume of the electrode is determined as 100 vol %.

The amount of the electrode active material contained in the electrode, is not particularly limited. It may be in a range of from 1 vol % to 99 vol %, when the total volume of the electrode is determined as 100 vol %.

The electrode active material contained in the electrode will not be described here, since it is the same as the electrode active material described above under "1. Method for producing electrode".

As needed, the electrode may contain other materials.

The electrode active material contained in the electrode of the disclosed embodiment, may be present in the voids of the first oxide electrolyte sintered body.

A method for allowing the electrode active material to be present in the voids of the first oxide electrolyte sintered body, may be as follows, for example: the electrode active material is mixed with the electrolyte material obtained by mixing the flux and the garnet-type ion-conducting oxide subjected to substitution with hydrogen ions in the above-mentioned "1. Method for producing electrode", which is used as the oxide electrolyte, to obtain a mixture, and the mixture is sintered, thereby allowing the electrode active material to be present in the voids. The material used as the flux, the mixing method, the sintering method and so on will not be described here, since they are the same as those described above under "1. Method for producing electrode".

The first oxide electrolyte sintered body may contain the crystal particles of the garnet-type ion-conducting oxide represented by the general formula (B). It may further contain other conventionally-known electrolyte materials.

As an impurity, hydrogen may be contained in the crystal particles of the sintered garnet-type ion-conducting oxide contained in the electrode. That is, hydrogen may be present in the composition of the garnet-type ion-conducting oxide, even if the garnet-type ion-conducting oxide is in the state of the sintered body obtained after sintering.

The composition of the general formula (B) will not be described here, since it is the same as the composition of the general formula (A), except that z is a real number satisfying $0 \leq z < 3.4$. The fact that z is a real number satisfying $0 \leq z < 3.4$, indicates that hydrogen may be contained as an impurity. Also, z may be 0.

The number average particle diameter of the crystal particles of the sintered garnet-type ion-conducting oxide contained in the electrode, may be 3 μm or less. The lower limit of the number average particle diameter is not particularly limited. From the viewpoint of handling, it may be 0.1 μm or more.

According to the disclosed embodiments, due to the presence of the flux, abnormal grain growth of the garnet-type ion-conducting oxide can be suppressed, and the crystal particles of the sintered garnet-type ion-conducting oxide contained in the electrode, can be present in such a state that the number average particle diameter is smaller (3 μm or less) than ever before.

Therefore, if it is confirmed by a SEM image, etc., that the number average particle diameter of the sintered garnet-type ion-conducting oxide contained in the electrode is 3 μm or less, the garnet-type ion-conducting oxide can be determined as an oxide obtained by low-temperature sintering.

The voidage of the first oxide electrolyte sintered body of the disclosed embodiments may be 27% or more, or it may be 27.6% or more. From the viewpoint of stabilizing the crystal structure, it may be 72% or less. From the viewpoint of reducing materials such as a pore forming material, it may be 42% or less.

Since the electrode active material enters the voids of the sintered garnet-type ion-conducting oxide, the voidage of the electrode of the disclosed embodiments may be lower than the voidage of the sintered garnet-type ion-conducting oxide.

The voidage can be measured by calculating the voidage from mass and volume (a vernier caliper method), can be measured by Archimedes' method, or can be measured using a porosimeter, for example.

[Estimated Porosity (Voidage)]

Figure 2:
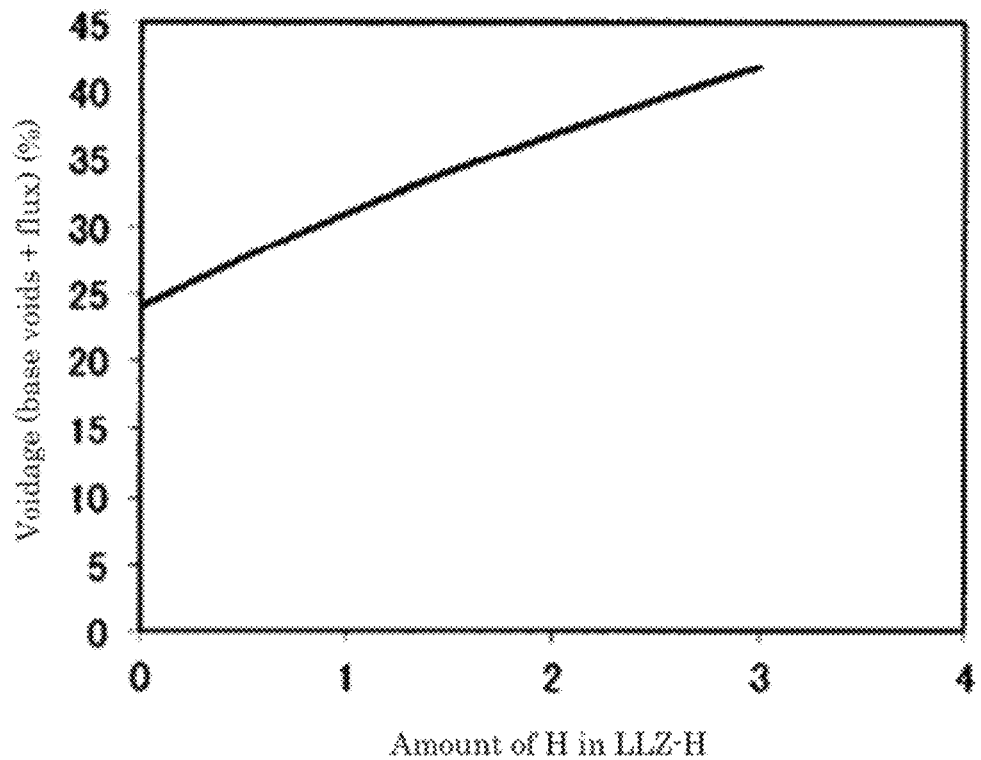
FIG. 2 is a view showing a relationship between the amount of H in a garnet-type ion-conducting oxide subjected to substitution with hydrogen ions and the voidage of a garnet-type ion-conducting oxide sintered body.

FIG. 2 is a view showing a relationship between the amount of H in the garnet-type ion-conducting oxide subjected to substitution with hydrogen ions, which is referred to as LLZ-H in FIG. 2, and the voidage of the sintered garnet-type ion-conducting oxide.

As shown in FIG. 2, it is estimated that by the solid phase flux reaction method, the voidage of the sintered garnet-type ion-conducting oxide can be about 42% by the evaporation of the flux, when H is 3 (H=3).

In the case of a hexagonal close-packed (hcp) structure, the voidage is at least 26% (a base voidage). After the flux reacts with the garnet-type ion-conducting oxide subjected to substitution, with hydrogen ions and is thus evaporated, the voidage is increased.

The amount of the flux depends on the amount of H in the garnet-type ion-conducting oxide subjected to substitution with hydrogen ions. It is thought that by the reaction between the flux and the garnet-type ion-conducting oxide subjected to substitution with hydrogen ions, about 18 vol % of the flux is evaporated, and the voidage of the sintered garnet-type ion-conducting oxide can be increased.

To increase the voidage further, a pore forming material may be added.

As the pore forming material, examples include, but are not limited to, conventionally-known materials such as an acrylic resin, polybenzimidazole (thermal decomposition temperature 600° C.), and a polysiloxane-based thermosetting resin such as KA-100 (product name, manufactured by ADEKA, thermal decomposition temperature 400° C.).

For the electrode of the disclosed embodiments, y in the general formula (B) may be a real number satisfying $0.13 < y < 0.22$. When y is in the range, the thus-obtained garnet-type ion-conducting oxide sintered body is hard, and it is indestructible even if it is a porous body.

The thickness of the electrode is not particularly limited. From the viewpoint of handling, the lower limit of the thickness may be 0.1 µm or more, or it may be 1 µm or more. The upper limit may be 500 µm or less, or it may be 100 µm or less.

Unlike an electrode obtained by sintering at high temperature (e.g., 1000° C. or more), the electrode of the disclosed embodiments is obtained by low-temperature sintering by the solid phase flux reaction method. Therefore, the lithium-containing flux is rarely present at interfaces of the crystal particles of the garnet-type ion-conducting oxide sintered body, and the lithium-containing flux segregates to the grain boundary triple junctions (the voids between the crystal particles).

3. Electrode-Electrolyte Layer Assembly

The electrode-electrolyte layer assembly of the disclosed embodiments is an electrode-electrolyte layer assembly comprising the electrode and an electrolyte layer comprising a second oxide electrolyte sintered body, wherein the second oxide electrolyte sintered body has grain boundaries between crystal, particles of a garnet-type ion-conducting oxide represented by the following general formula (C):

$$(Li_{x-3y-z}E_yH_z)L_\alpha M_\beta O_\gamma \quad \text{General Formula (C)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively, and wherein a lithium-containing flux is present at grain boundary triple junctions between the crystal particles.

It was found that the hardness and formability of the garnet-type ion-conducting oxide are changed by controlling the amount of the element E in the general formula (C).

Therefore, a battery material with desired properties (such as an electrode and an electrolyte layer) can be obtained by changing the composition of the garnet-type ion-conducting oxide, depending on the intended application of the garnet-type ion-conducting oxide.

The composition of the general formula (C) will not be described here, since it is the same as the composition of the above-described general formula (B).

Figure 3:
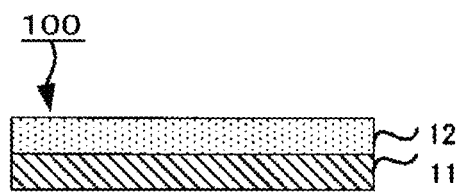
FIG. 3 is a schematic sectional view of an example of the electrode-electrolyte layer assembly according to the disclosed embodiments.

FIG. 3 is a schematic sectional view of an example of the electrode-electrolyte layer assembly according to the disclosed embodiments.

As shown in FIG. 3, an electrode-electrolyte layer assembly 100 is a stack of an electrode 11 and an electrolyte layer 12.

In the disclosed embodiments, the electrode functions as the cathode or anode of a battery. The type of the battery is not particularly limited. The electrode of the disclosed embodiments can be used as an electrode of various kinds of batteries.

In the disclosed embodiment, the electrolyte layer is disposed between the cathode and the anode, separates the cathode and the anode from each other, and functions to conduct ions between the cathode and the anode.

The electrolyte layer comprises at least the second oxide electrolyte sintered body.

The second oxide electrolyte sintered body may contain at least the crystal particles of the sintered garnet-type ion-conducting oxide represented by the general formula (C).

In the general formula (C), y may be a real number satisfying $0 \leq y \leq 0.13$, from the viewpoint of enhancing the formability of the sintered garnet-type ion-conducting oxide, and reducing the voids to density the garnet-type ion-conducting oxide and increase the ion conductivity.

The amount of the sintered garnet-type ion-conducting oxide contained in the electrolyte layer, is not particularly limited. It may be in a range of from 1 mass % to 100 mass %, when the total mass of the electrolyte layer is determined as 100 mass %.

The thickness of the electrolyte layer may be 2000 µm or less, may be 1000 µm or less, may be 400 µm or less, or may be 100 µm or less. In this case, a reduction in battery size can be achieved. The lower limit of the thickness of the electrolyte layer may be 10 µm or more, or may be 20 µm or more, from the viewpoint of handling.

The crystal particles of the sintered garnet-type ion-conducting oxide contained in the electrode, will not be described here, since they are the same as those described above under "2. Electrode".

The method for bonding the electrode and the electrolyte layer is not particularly limited. For example, they may be bonded as follows: the electrode is produced, and a slurry of the garnet-type ion-conducting oxide subjected to substitution with hydrogen ions, is applied on the electrode and sintered to form the electrolyte layer, thereby bonding the electrode and the electrolyte layer.

Also, the electrode and the electrolyte layer may be bonded by integrally sintering them.

In the case of integrally sintering the electrode and the electrolyte layer, it may be carried out as follows, for example: the electrode active material and the garnet-type ion-conducting oxide subjected to substitution with hydrogen ions are mixed; the mixture is formed to obtain the electrode material layer, which serves as the electrode; a slurry of the garnet-type ion-conducting oxide subjected to substitution with hydrogen ions, which serves as the electrolyte layer, is applied on the electrode material layer; and the resulting product is sintered, thereby integrally sintering the electrode and the electrolyte layer.

The sintering condition will not be described here, since it is the same as the condition described above under "1. Method for producing electrode".

EXAMPLES

Reference Experimental Example 1

[Synthesis of Garnet-Type Ion-Conducting Oxide]

Stoichiometric amounts of LiOH(H$_2$O) (manufactured by Sigma-Aldrich), La(OH)$_3$ (manufactured by Kojundo Chemical Laboratory Co., Ltd.), ZrO$_z$ (manufactured by Kojundo Chemical Laboratory Co., Ltd.) and Nb$_2$O$_5$ (manufactured by Kojundo Chemical Laboratory Co., Ltd.) were used as starting raw materials and mixed to obtain a mixture.

The mixture and a flux (NaCl) were heated from room temperature to 950° C. for 8 hours and then kept at 950° C. for 20 hours, thereby obtaining crystal particles of a garnet-type ion-conducting oxide not subjected to substitution with hydrogen ions, the oxide having the composition of Li$_{6.4}$La$_3$Zr$_{1.4}$Nb$_{0.6}$O$_{12}$.

The number average particle diameter of the thus-obtained crystal particles of the garnet-type ion-conducting oxide not subjected to substitution with hydrogen ions, was 2.8 µm.

Figure 4:
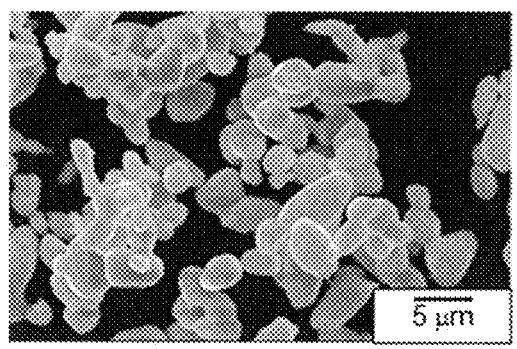
FIG. 4 is a SEM image of crystal particles of a garnet-type ion-conducting oxide not subjected to substitution with hydrogen ions of Reference Experimental Example 1.

FIG. 4 is a SEM image of the thus-obtained crystal particles of the garnet-type ion-conducting oxide not subjected to substitution with hydrogen ions.

[Substitution with Hydrogen Ions]

Then, at room temperature, 2 g of the thus-obtained crystal particles of the garnet-type ion-conducting oxide not subjected to substitution with hydrogen ions, were immersed in pure water (200 ml) for several minutes to substitute, with hydrogen ions, part of lithium ions in the garnet-type ion-conducting oxide not subjected to substitution with hydrogen ions. Therefore, the crystal particles of the garnet-type ion-conducting oxide subjected to substitution with hydrogen ions, the oxide having the composition of $Li_{5.5}H_{0.9}La_3Zr_{1.4}Nb_{0.6}O_{12}$, were obtained. In the composition of the garnet-type ion-conducting oxide, the amount of Li substituted with H was 0.9.

The crystal particles of the garnet-type ion-conducting oxide were subjected to ICP analysis before and after the substitution with hydrogen ions. From the amount of change in the lithium element in the composition of the garnet-type ion-conducting oxide before and after being subjected to the substitution with hydrogen ions, the amount of hydrogen ions incorporated by the substitution was estimated. Then, the composition of the garnet-type ion-conducting oxide crystal particles subjected to substitution with hydrogen ions, was estimated.

[Sintering (Resubstitution)]

The $Li_{5.5}H_{0.9}La_3Zr_{1.4}Nb_{0.6}O_{12}$ crystal particles subjected to substitution with hydrogen ions and 0.9 mol of LiOH were dry-mixed in a mortar to obtain a mixed powder.

The amount of the flux was controlled so that the amount of the flux and the amount of hydrogen were at a stoichiometric ratio of 1:1.

The number average particle diameter of the LiOH was 5 μm. Vacuum drying at 130° C. and the subsequent dry pulverization were repeatedly carried out on the LiOH, until the number average particle diameter became 5 μm.

As a solvent, 2-butanol was added to the mixed powder. A green sheet was produced.

The thus-obtained green sheet was heated at 400° C. for 8 hours in an argon atmosphere under a normal pressure condition, thereby obtaining a garnet-type ion-conducting oxide sintered body.

Figure 5:
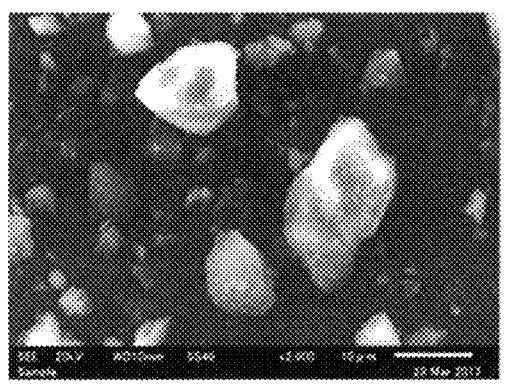
FIG. 5 is a SEM image of a flux of Reference Experimental Example 1.
Figure 6:
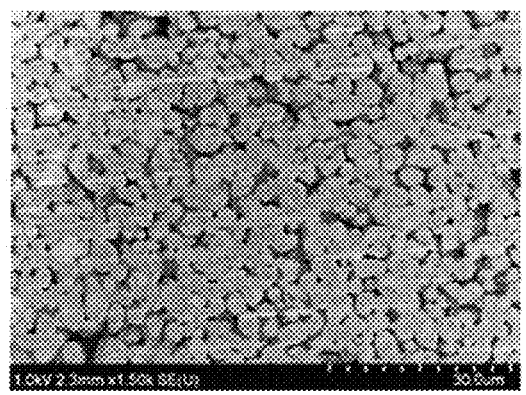
FIG. 6 is a SEM image of a garnet-type ion-conducting oxide sintered body of Reference Experimental Example 1.

FIG. 5 is a SEM image of the prepared flux. FIG. 6 is a SEM image of the garnet-type ion-conducting oxide sintered body obtained by heating.

The voidage of the thus-obtained sintered body was 27.6%.

From FIG. 6, the following facts are found: there are grain boundaries between the crystal particles; the number average particle diameter of the crystal particles is 3 μm or less; and the form of the crystal particles is retained. It is thought that this is because, since the number average particle diameter of the flux was larger than the number average particle diameter of the crystal particles of the garnet-type ion-conducting oxide, the voidage was increased.

Reference Experimental Example 2

Crystal particles of a garnet-type ion-conducting oxide subjected to substitution with hydrogen ions, the oxide having the composition of $Li_{5.5}H_{0.9}La_3Zr_{1.4}Nb_{0.6}O_{12}$, were obtained in the same manner as Reference Experimental Example 1.

[Sintering (Resubstitution)]

The $Li_{5.5}H_{0.9}La_3Zr_{1.4}Nb_{0.6}O_{12}$ crystal particles subjected to substitution with hydrogen ions and 0.945 mol of $LiNO_3$ were dry-mixed in a mortar to obtain a mixed powder.

The amount of the flux was controlled so that the amount of the flux and the amount of hydrogen were at a stoichiometric ratio of 1.05:1.

The number average particle diameter of the $LiNO_3$ was 5 μm.

As a solvent, 2-butanol was added to the mixed powder. As a binder (a hole forming material), IBM-2 (an acrylic resin manufactured by Sekisui Chemical Co., Ltd.) was added thereto. A green sheet was produced.

The thus-obtained green sheet was heated at 400° C. for 6 hours in an oxygen atmosphere under a normal pressure condition, thereby obtaining a garnet-type ion-conducting oxide sintered body.

Figure 7:
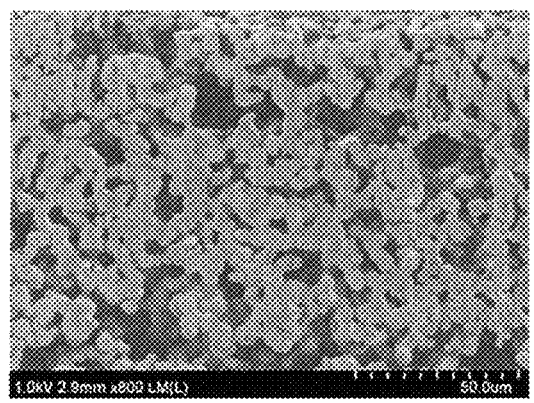
FIG. 7 is a SEM image of a garnet-type ion-conducting oxide sintered body of Reference Experimental Example 2.

FIG. 7 is a SEM image of the garnet-type ion-conducting oxide sintered body obtained by heating.

The voidage of the thus-obtained sintered body was 54.0%.

From FIG. 7, the following facts are found: there are grain boundaries between the crystal particles; the number average particle diameter of the crystal particles is 3 μm or less; and the form of the crystal particles is retained. It is thought that this is because, since the number average particle diameter of the flux was larger than the number average particle diameter of the crystal particles of the garnet-type ion-conducting oxide, the voidage was increased.

Reference Experimental Example 3

Crystal particles of a garnet-type ion-conducting oxide not subjected to substitution with hydrogen ions, the oxide having the composition of $Li_{6.4}La_3Zr_{1.4}Nb_{0.6}O_{12}$, were obtained in the same manner as Reference Experimental Example 1. The number average particle diameter of the garnet-type ion-conducting oxide not subjected to substitution with hydrogen ions, was 3 μm.

The thus-obtained crystal particles of the garnet-type ion-conducting oxide not subjected to substitution with hydrogen ions were mixed with, as a pore forming material, a cross-linking acrylic resin to obtain a mixed powder.

The garnet-type ion-conducting oxide not subjected to substitution with hydrogen ions and the pore forming material were at a volume ratio of 40:60 (vol %).

The mixed powder was pressed at room temperature (load: 1 ton/cm² (≈98 MPa)) to obtain a pressed powder. The pressed powder was heated at 900° C. for 8 hours in an argon atmosphere under a normal pressure condition, thereby obtaining a garnet-type ion-conducting oxide sintered body.

Figure 8:
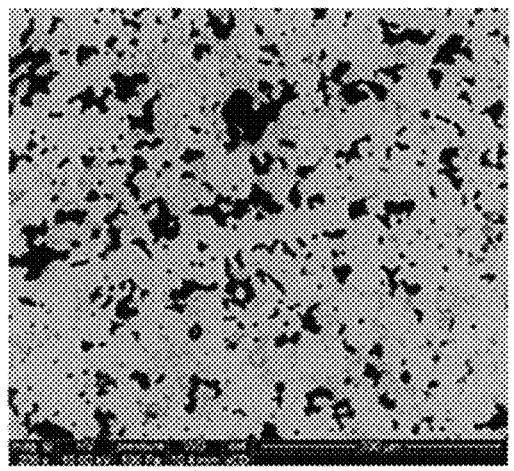
FIG. 8 is a SEM image of a garnet-type ion-conducting oxide sintered body of Reference Experimental Example 3.

FIG. 8 is a SEM image of the garnet-type ion-conducting oxide sintered body obtained by heating.

In FIG. 8, the crystal particles are rarely found. It is thought that this is because crystal grain growth was caused by pressing the mixed powder and sintering the mixed powder at high temperature.

As just described, for the sintered body of Reference Experimental Example 3, the crystal particles are rarely found, and the grain boundary triple junctions between the crystal particles are broken. From the results of Reference Experimental Example 3, it is presumed that if the electrode further comprising an electrode active material is produced by the same production process, no grain boundaries are found between the crystal particles, or the number average particle diameter of the crystal particles is 3 μm or more. It is also presumed that due to the high heating temperature, if the electrode is treated while containing the electrode active material, a chemical reaction is caused between the electrode active material and the crystal particles of the garnet-type ion-conducting oxide, thereby forming a high-resistive layer.

Meanwhile, for the sintered bodies of Reference Experimental Examples 1 and 2, the following facts were found: there are grain boundaries between the crystal particles; the number average particle diameter of the crystal particles is 3 μm or less; the form of the crystal particles is retained; and the voidage is 27.6% or 54.0%. From these results, it is predicted that even if the electrode further comprising an electrode active material is produced by the same production process as above, a porous body having a voidage of 27% or more can be produced.

Reference Experimental Example 4

Crystal particles of a garnet-type ion-conducting oxide subjected to substitution with hydrogen ions, the oxide having the composition of $Li_{5.0}H_{0.8}Al_{0.2}La_3Zr_{1.4}Nb_{0.6}O_{12}$, were obtained in the same manner as Reference Experimental Example 1, except that $Al_2O_3$ was further used as a raw material.

The thus-obtained crystal particles of the garnet-type ion-conducting oxide subjected to substitution with hydrogen ions, the oxide having the composition of $Li_{5.0}H_{0.8}Al_{0.2}La_3Zr_{1.4}Nb_{0.6}O_{12}$, and a powder of $LiNO_3$ were weighed so that the amount of the $LiNO_3$ powder was 1.1 times (0.88 $LiNO_3$) the amount of H (0.8) in the composition ($Li_{5.0}H_{0.8}Al_{0.2}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm², thereby obtaining a garnet-type ion-conducting oxide sintered body.

Reference Experimental Example 5

Crystal particles of a garnet-type ion-conducting oxide subjected to substitution with hydrogen ions, the oxide having the composition of $Li_{5.1}H_{1.0}Al_{0.13}La_3Zr_{1.4}Nb_{0.6}O_{12}$, were obtained in the same manner as Reference Experimental Example 4.

The thus-obtained crystal particles of the garnet-type ion-conducting oxide subjected to substitution with hydrogen ions, the oxide having the composition of $Li_{5.1}H_{1.0}Al_{0.13}La_3Zr_{1.4}Nb_{0.6}O_{12}$, and a powder of $LiNO_3$ were weighed so that the amount of the $LiNO_3$ powder was 1.1 times (1.1 $LiNO_3$) the amount of H (1.0) in the composition ($Li_{5.1}H_{1.0}Al_{0.13}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm², thereby obtaining a garnet-type ion-conducting oxide sintered body.

Reference Experimental Example 6

Crystal particles of a garnet-type ion-conducting oxide subjected to substitution with hydrogen ions, the oxide having the composition of $Li_{5.14}H_{0.9}Al_{0.12}La_3Zr_{1.4}Nb_{0.6}O_{12}$, were obtained in the same manner as Reference Experimental Example 4.

The thus-obtained crystal particles of the garnet-type ion-conducting oxide subjected to substitution with hydrogen ions, the oxide having the composition of $Li_{5.14}H_{0.9}Al_{0.12}La_3Zr_{1.4}Nb_{0.6}O_{12}$, and a powder of $LiNO_3$ were weighed so that the amount of the $LiNO_3$ powder was 1.1 times (0.99 $LiNO_3$) the amount of H (0.9) in the composition ($Li_{5.14}H_{0.9}Al_{0.12}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm², thereby obtaining a garnet-type ion-conducting oxide sintered body.

Reference Experimental Example 7

Crystal particles of a garnet-type ion-conducting oxide subjected to substitution with hydrogen ions, the oxide having the composition of $Li_{5.2}H_{1.1}Al_{0.05}La_3Zr_{1.4}Nb_{0.6}O_{12}$, were obtained in the same manner as Reference Experimental Example 4.

The thus-obtained crystal particles of the garnet-type ion-conducting oxide subjected to substitution with hydrogen ions, the oxide having the composition of $Li_{5.2}H_{1.1}Al_{0.05}La_3Zr_{1.4}Nb_{0.6}O_{12}$, and a powder of $LiNO_3$ were weighed so that the amount of the $LiNO_3$ powder was 1.1 times (1.2 $LiNO_3$) the amount of H (1.1) in the composition ($Li_{5.2}H_{1.1}Al_{0.05}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm², thereby obtaining a garnet-type ion-conducting oxide sintered body.

Reference Experimental Example 8

Crystal particles of a garnet-type ion-conducting oxide subjected to substitution with hydrogen ions, the oxide having the composition of $Li_{5.38}H_{0.9}Al_{0.04}La_3Zr_{1.4}Nb_{0.6}O_{12}$, were obtained in the same manner as Reference Experimental Example 4.

The thus-obtained crystal particles of the garnet-type ion-conducting oxide subjected to substitution with hydrogen ions, the oxide having the composition of $Li_{5.38}H_{0.9}Al_{0.04}La_3Zr_{1.4}Nb_{0.6}O_{12}$, and a powder of $LiNO_3$ were weighed so that the amount of the $LiNO_3$ powder was 1.1 times (1.1 $LiNO_3$) the amount of H (0.9) in the composition ($Li_{5.38}H_{0.9}Al_{0.04}La_3Zr_{1.4}Nb_{0.6}O_{12}$) of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm², thereby obtaining a garnet-type ion-conducting oxide sintered body.

Reference Experimental Example 9

Crystal particles of a garnet-type ion-conducting oxide subjected to substitution with hydrogen ions, the oxide having the composition of $Li_{5.3}H_{1.0}Al_{0.02}La_3Zr_{1.4}Nb_{0.6}O_{12}$, were obtained in the same manner as Reference Experimental Example 4.

The thus-obtained crystal particles of the garnet-type ion-conducting oxide subjected to substitution with hydrogen ions, the oxide having the composition of $Li_{5.3}H_{1.0}Al_{0.02}La_3Zr_{1.4}Nb_{0.6}O_{12}$, and a powder of $LiNO_3$ were weighed so that the amount of the LiNO$_3$ powder was 1.1 times (1.1 LiNO$_3$) the amount of H (1.0) in the composition (Li$_{5.3}$H$_{1.0}$Al$_{0.02}$La$_3$Zr$_{1.4}$Nb$_{0.6}$O$_{12}$) of the garnet-type ion-conducting oxide subjected to substitution with hydrogen ions. Then, the crystal particles and the LiNO$_3$ powder were dry-mixed in a mortar to obtain a mixed powder. The mixed powder was hot-pressed under conditions of 400° C. and 1 ton/cm$^2$, thereby obtaining a garnet-type ion-conducting oxide sintered body.

Reference Experimental Example 10

Crystal particles of a garnet-type ion-conducting oxide subjected to substitution with hydrogen ions, the oxide having the composition of Li$_{5.5}$H$_{0.9}$La$_3$Zr$_{1.4}$Nb$_{0.6}$O$_{12}$, were obtained in the same manner as Reference Experimental Example 4.

The thus-obtained crystal particles of the garnet-type ion-conducting oxide subjected to substitution with hydrogen ions, the oxide having the composition of Li$_{5.5}$H$_{0.9}$La$_3$Zr$_{1.4}$Nb$_{0.6}$O$_{12}$, and a powder of LiNO$_3$ were weighed so that the amount of the LiNO$_3$ powder was 1.1 times (0.99 LiNO$_3$) the amount of H (0.9) in the composition (Li$_{5.5}$H$_{0.9}$La$_3$Zr$_{1.4}$Nb$_{0.6}$O$_{12}$) of the garnet-type ion-conducting oxide subjected to substitution with hydrogen ions. Then, the crystal particles and the LiNO$_3$ powder were dry-mixed in a mortar to obtain a mixed powder. The mixed powder was hot-pressed under conditions of 400° C. and 1 ton/cm$^2$, thereby obtaining a garnet-type ion-conducting oxide sintered body.

Figure 9:
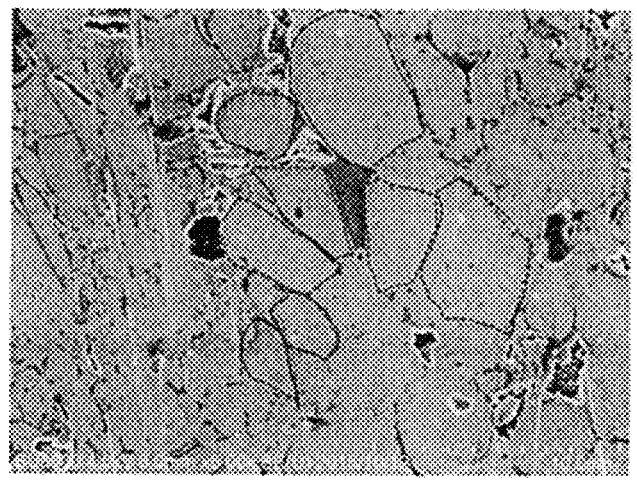
FIG. 9 is a SEM image of a garnet-type ion-conducting oxide sintered body of Reference Experimental Example 10.

FIG. 9 is a SEM image of a section (processed by ion milling at 4 kV) of the garnet-type ion-conducting oxide sintered body of Reference Experimental Example 10.

As shown in FIG. 9, for the section of the garnet-type ion-conducting oxide sintered body of Reference Experimental Example 10, LiNO$_3$ is rarely present at interfaces (grain boundaries) of the particles of the garnet-type ion-conducting oxide sintered body, and LiNO$_3$ segregates to the grain boundary triple junctions (voids between the crystal particles).

Therefore, it is clear that the crystal particles of the garnet-type ion-conducting oxide are well-bonded to each other, and inhibition of lithium ion conduction is suppressed at the grain boundaries.

[Measurement of Lithium Ion Conductivity]

Lithium ion conductivity measurement was carried out on the garnet-type ion-conducting oxide sintered bodies produced in Reference Experimental Examples 4 to 10. The lithium ion conductivities of the garnet-type ion-conducting oxide sintered bodies of Reference Experimental Examples 4 to 10, are as follows: 2.6×10$^{-6}$ S/cm in Reference Experimental Example 4, 3.91×10$^{-5}$ S/cm in Reference Experimental Example 5, 7.34×10$^{-5}$ S/cm in Reference Experimental Example 6, 2.2×10$^{-4}$ S/cm in Reference Experimental Example 7, 2.6×10$^{-4}$ S/cm in Reference Experimental Example 8, 1.5×10$^{-4}$ S/cm in Reference Experimental Example 9, and 4.5×10$^{-4}$ S/cm in Reference Experimental Example 10.

Figure 10:
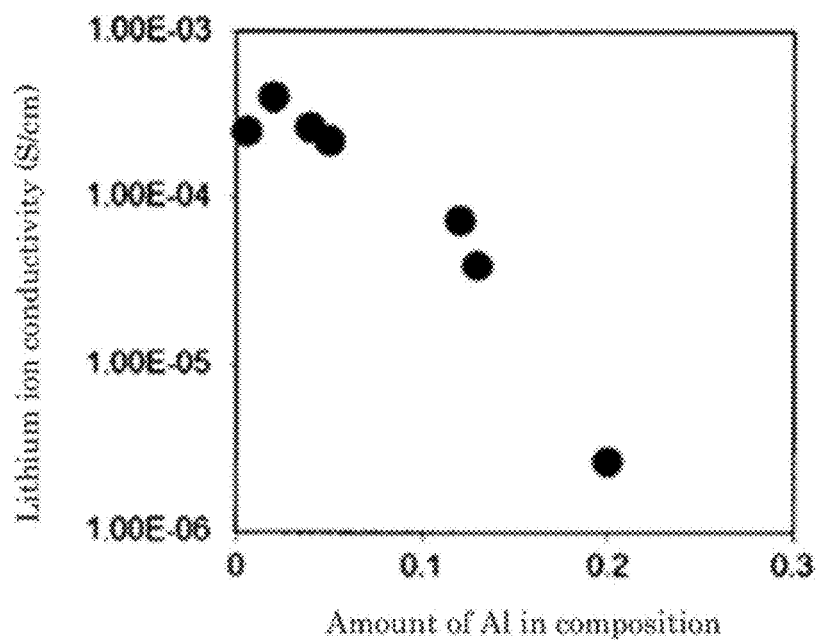
FIG. 10 is a view showing a relationship between the lithium ion conductivity of a garnet-type ion-conducting oxide sintered body produced in each of Reference Experimental Examples 4 to 10 and the amount of Al in the composition of the garnet-type ion-conducting oxide sintered body.

FIG. 10 is a view showing a relationship between the lithium ion conductivity of the garnet-type ion-conducting oxide sintered body produced in each of Reference Experimental Examples 4 to 10 and the amount of Al in the composition of the garnet-type ion-conducting oxide sintered body.

[Measurement of Relative Density]

For each of the garnet-type ion-conducting oxide sintered bodies produced in Reference Experimental Examples 4 to 10, the relative density D (%) was calculated.

The relative density (%) was calculated by the following formula, which is the relative value of the sintered density B (g/cm$^3$) with respect to the arithmetically obtained theoretical density A (g/cm$^3$):

Relative density (%)=(B/A)×100

The theoretical density A of the garnet-type ion-conducting oxide sintered body was calculated as follows.

As the theoretical density A, the true density of a general garnet-type ion-conducting oxide (5.10 g/cm$^3$) was used.

The sintered density B was calculated as follows. A sample was obtained from each of the garnet-type ion-conducting oxide sintered bodies produced in Reference Experimental Examples. The sintered density B was calculated from the mass and outer size of the sample.

Figure 11:
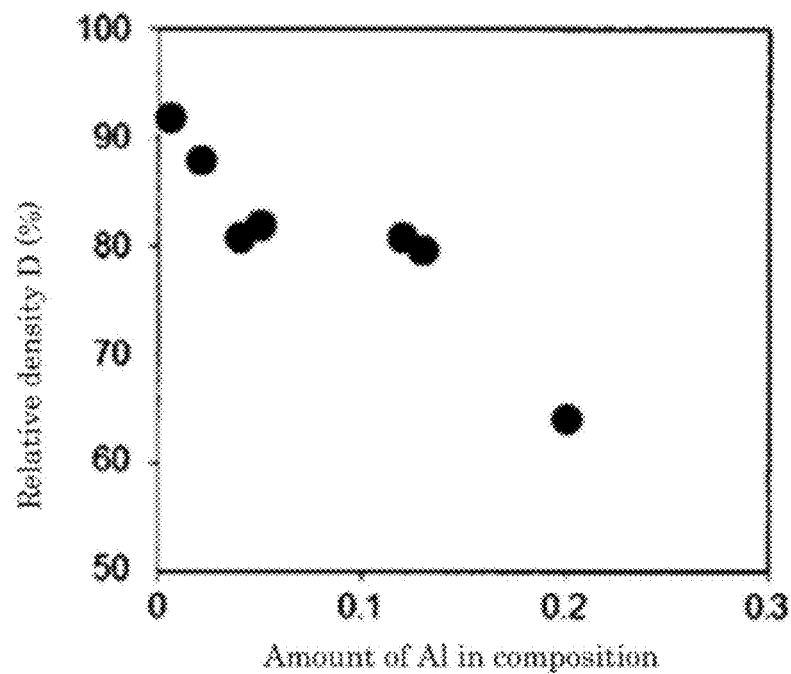
FIG. 11 is a view showing a relationship between the relative density of the garnet-type ion-conducting oxide sintered body produced in each of Reference Experimental Examples 4 to 10 and the amount of Al in the composition of the garnet-type ion-conducting oxide sintered body.

FIG. 11 is a view showing a relationship between the relative density of the garnet-type ion-conducting oxide sintered body produced in each of Reference Experimental Examples 4 to 10 and the amount of Al in the composition of the garnet-type ion-conducting oxide sintered body.

The relative densities of the garnet-type ion-conducting oxide sintered bodies of Reference Experimental Examples 4 to 10, are as follows: 64.2% in Reference Experimental Example 4, 79.8% in Reference Experimental Example 5, 81.2% in Reference Experimental Example 6, 82.0% in Reference Experimental Example 7, 85.4% in Reference Experimental Example 8, 88.0% in Reference Experimental Example 9, and 92.0% in Reference Experimental Example 10.

As is clear from FIGS. 10 and 11, the lithium ion conductivity and relative density of the garnet-type ion-conducting oxide sintered body largely depend on the amount of Al in the composition of the garnet-type ion-conducting oxide sintered body.

More specifically, it is clear that as the amount of Al in the composition of the garnet-type ion-conducting oxide sintered body decreases, the relative density and the lithium ion conductivity increase. It is thought that this is because as the amount of Al in the composition of the garnet-type ion-conducting oxide sintered body decreases, the crystal particles of the garnet-type ion-conducting oxide are more likely to cause desired plastic deformation and be densified.

Therefore, battery performance can be increased by using the garnet-type ion-conducting oxide in an electrode or in an electrolyte, which is determined depending on the amount of the element E in the garnet-type ion-conducting oxide.

In the case of using the garnet-type ion-conducting oxide in the electrode, as the garnet-type ion-conducting oxide, a garnet-type ion-conducting oxide that is a porous body and has high hardness, can be used from the point of view that the electrode can adapt to expansion and contraction of the active material, which is associated with occlusion and release of Li ions. In particular, y in the above-described general formulae (A), (B) and (D) may be a real number satisfying 0.13<y<0.22.

In the case of using the garnet-type ion-conducting oxide in the electrolyte layer, as the garnet-type ion-conducting oxide, a garnet-type ion-conducting oxide with high density can be used from the viewpoint of increasing ion conductivity and obtaining functions as a separator. In particular, y in the above-described general formulae (A), (C) and (D) may be a real number satisfying $0 \leq y \leq 0.13$.

Reference Experimental Example 11

Crystal particles of a garnet-type ion-conducting oxide not subjected to substitution with hydrogen ions, the oxide having the composition of $Li_{6.4}La_3Zr_{1.4}Nb_{0.6}O_{12}$, were obtained in the same manner as Reference Experimental Example 1.

At room temperature, 2.0 g of the thus-obtained crystal particles of the garnet-type ion-conducting oxide not subjected to substitution with hydrogen ions, were immersed in pure water (500 mL) for 48 hours to substitute part of Li ions with hydrogen ions, thereby obtaining the crystal particles of the garnet-type ion-conducting oxide subjected to substitution with hydrogen ions, the oxide having the composition of $Li_{3.0}H_{3.4}La_3Zr_{1.4}Nb_{0.6}O_{12}$.

Therefore, it is clear that the garnet-type ion-conducting oxide subjected to substitution with hydrogen ions is obtained, in which the hydrogen (H) content ratio z in the general formula (A) is 3.4.

REFERENCE SIGNS LIST

11. Electrode
12. Electrolyte layer
100. Electrode-electrolyte layer assembly

The invention claimed is:

1. A method for producing an electrode comprising a first oxide electrolyte sintered body and an electrode active material,
the method comprising:
preparing crystal particles of a garnet-type ion-conducting oxide represented by the following general formula (A):

  General Formula (A)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 < z \leq 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;
preparing a lithium-containing flux;
preparing the electrode active material;
preparing an electrolyte material by mixing the crystal particles of the garnet-type ion-conducting oxide and the flux; and
sintering the electrolyte material and the electrode active material by heating at a temperature of 650° C. or less,
wherein a number average particle diameter of the flux is larger than a number average particle diameter of the crystal particles of the garnet-type ion-conducting oxide.

2. An electrode comprising a first oxide electrolyte sintered body and an electrode active material,
wherein the first oxide electrolyte sintered body has grain boundaries between crystal particles of a garnet-type ion-conducting oxide represented by the following general formula (B):

  General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;
wherein a lithium-containing flux is present at grain boundary triple junctions between the crystal particles; and
wherein the first oxide electrolyte sintered body is a porous body having a voidage of 27% or more formed by sintering the crystal particles of the garnet-type ion-conducting oxide and the lithium-containing flux at atmospheric pressure, the lithium-containing flux having a number average particle diameter greater than a number average particle diameter of the crystal particles of the garnet-type ion-conducting oxide.

3. An electrode comprising a first oxide electrolyte sintered body and an electrode active material,
wherein the first oxide electrolyte sintered body has grain boundaries between crystal particles of a garnet-type ion-conducting oxide represented by the following general formula (B):

  General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;
wherein a number average particle diameter of the crystal particles is 3 μm or less; and
wherein the first oxide electrolyte sintered body is a porous body having a voidage of 27% or more formed by sintering a mixture of the crystal particles and a lithium-containing flux having a number average particle diameter greater than the number average particle diameter of the crystal particles.

4. The electrode according to claim 2, wherein y in the general formula (B) is in a range of $0.13 < y < 0.22$.

5. An electrode-electrolyte layer assembly comprising the electrode defined by claim 4 and an electrolyte layer comprising a second oxide electrolyte sintered body,
wherein the second oxide electrolyte sintered body has grain boundaries between crystal particles of a garnet-type ion-conducting oxide represented by the following general formula (C):

  General Formula (C)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and γ are real numbers in ranges of 2.5≤α≤3.5, 1.5≤β≤2.5 and 11≤γ≤13, respectively, and wherein a lithium-containing flux is present at grain boundary triple junctions between the crystal particles.

6. The electrode-electrolyte layer assembly according to claim 5, wherein y in the general formula (C) is in a range of 0≤y≤0.13.

7. The electrode according to claim 3, wherein y in the general formula (B) is in a range of 0.13<y<0.22.

8. An electrode-electrolyte layer assembly comprising the electrode defined by claim 7 and an electrolyte layer comprising a second oxide electrolyte sintered body, wherein the second oxide electrolyte sintered body has grain boundaries between crystal particles of a garnet-type ion-conducting oxide represented by the following general formula (C):

   General Formula (C)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and elements in groups 12 to 15 of the periodic table; x, y and z are real numbers satisfying 3≤x−3y−z≤7, 0≤y<0.22 and 0≤z<3.4; and α, β and γ are real numbers in ranges of 2.5≤α≤3.5, 1.5≤β≤2.5 and 11≤γ≤13, respectively, and wherein a lithium-containing flux is present at grain boundary triple junctions between the crystal particles.

9. The electrode-electrolyte layer assembly according to claim 8, wherein y in the general formula (C) is in a range of 0≤y≤0.13.

* * * * *